United States Patent [19]
Muko

[11] 4,017,999
[45] Apr. 19, 1977

[54] FISH-FEEDER
[76] Inventor: Sakae Muko, 515, Kamitsutsui, Oonojo, Fukuoka, Japan
[22] Filed: July 11, 1975
[21] Appl. No.: 595,245
[52] U.S. Cl. .............................................. 43/44.99
[51] Int. Cl.² ........................................ A01K 97/02
[58] Field of Search ........... 43/44.99, 42.06, 43.12, 43/41, 41.2

[56] References Cited
UNITED STATES PATENTS

| | | | |
|---|---|---|---|
| 2,709,317 | 5/1955 | Pease, Jr. .......................... | 43/44.99 |
| 2,941,327 | 6/1960 | Rundell ............................. | 43/44.99 |
| 3,163,957 | 1/1965 | Barrett ............................. | 43/41.2 |

*Primary Examiner*—Warner H. Camp
*Attorney, Agent, or Firm*—Frank J. Jordan

[57] ABSTRACT

A fish-feeder includes a bell-shaped container and a bottom lid which is pivotally secured to the container whereby bait which is initially disposed in the container is released in the water when the bottom lid is opened.

1 Claim, 16 Drawing Figures

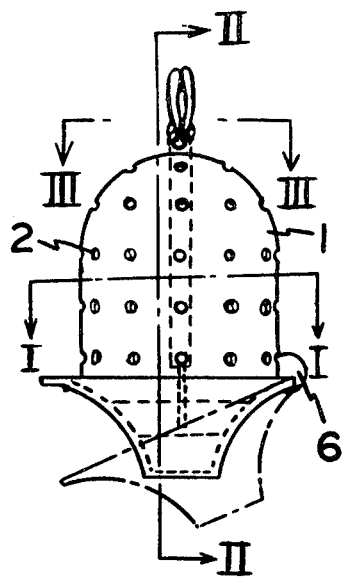
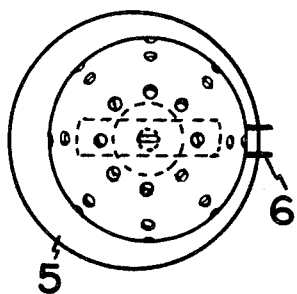
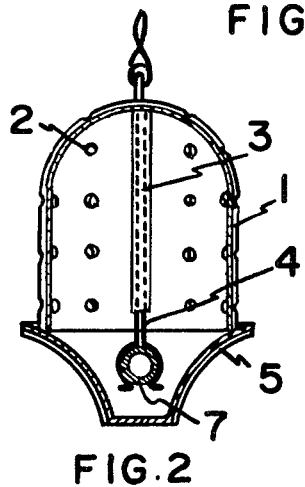
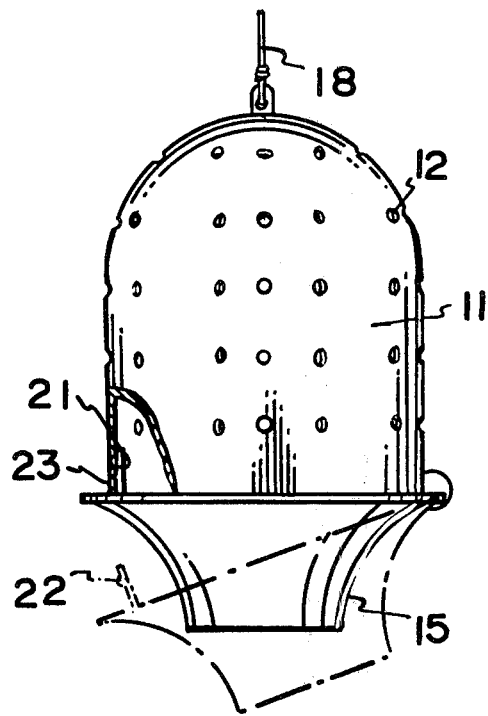
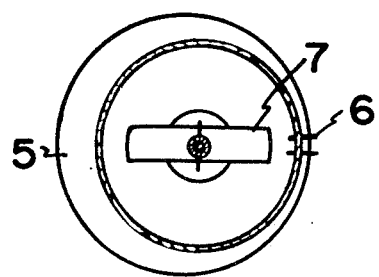

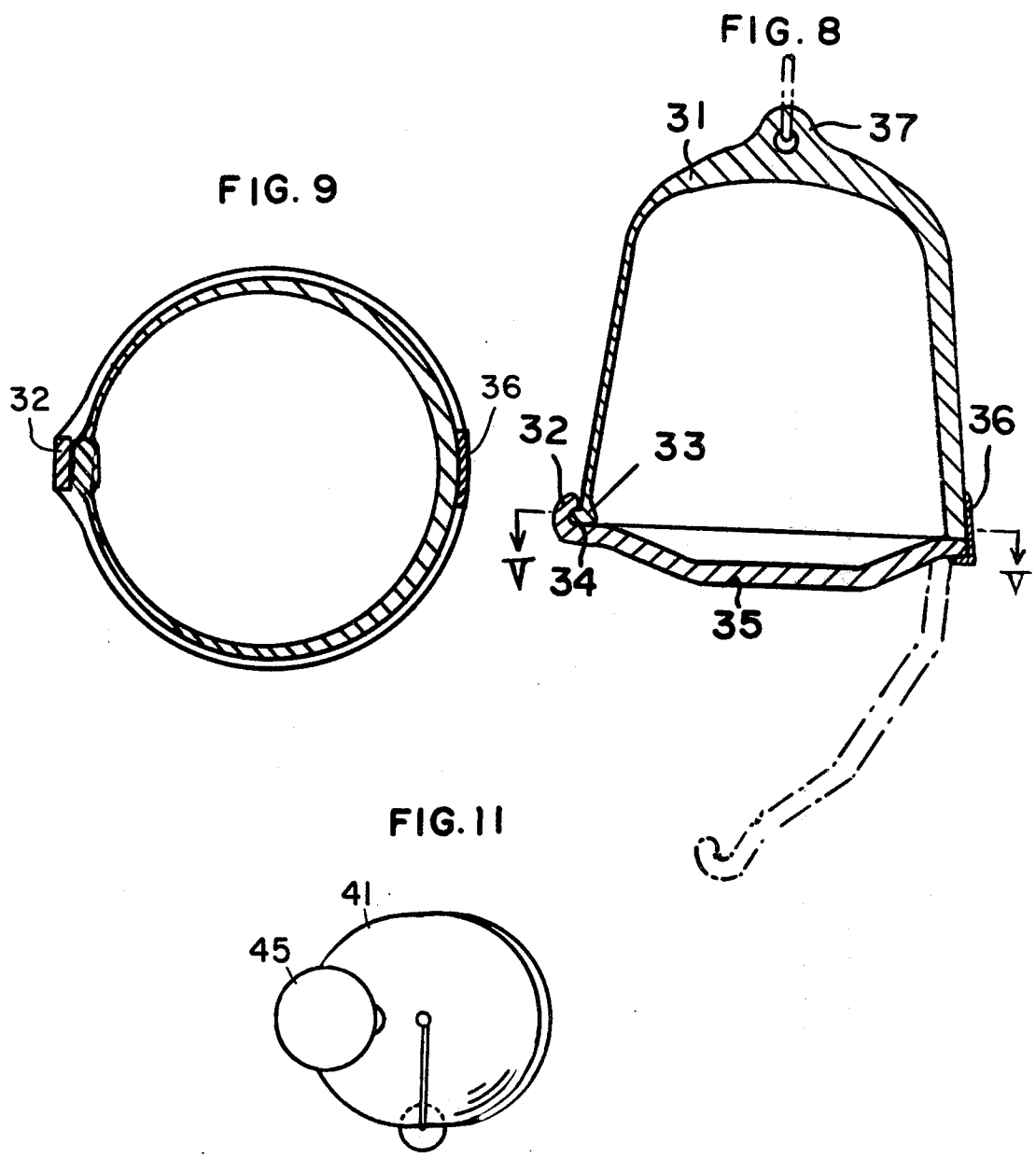

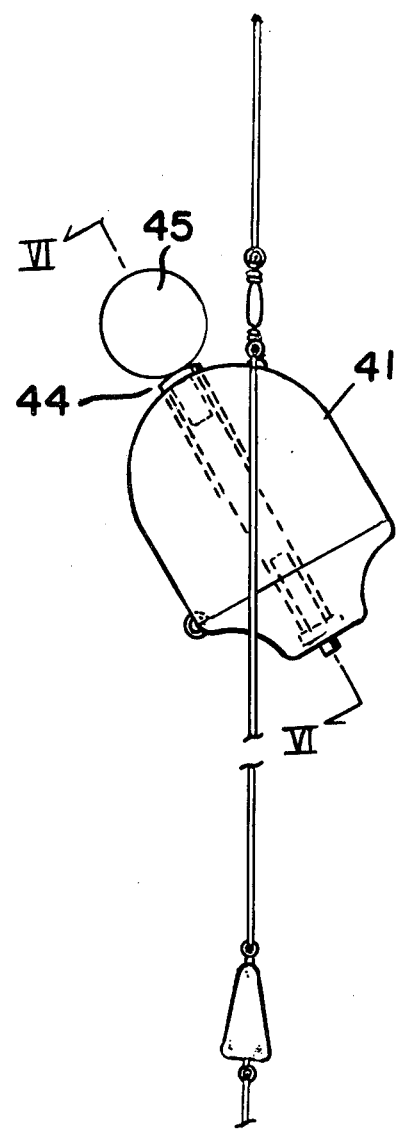
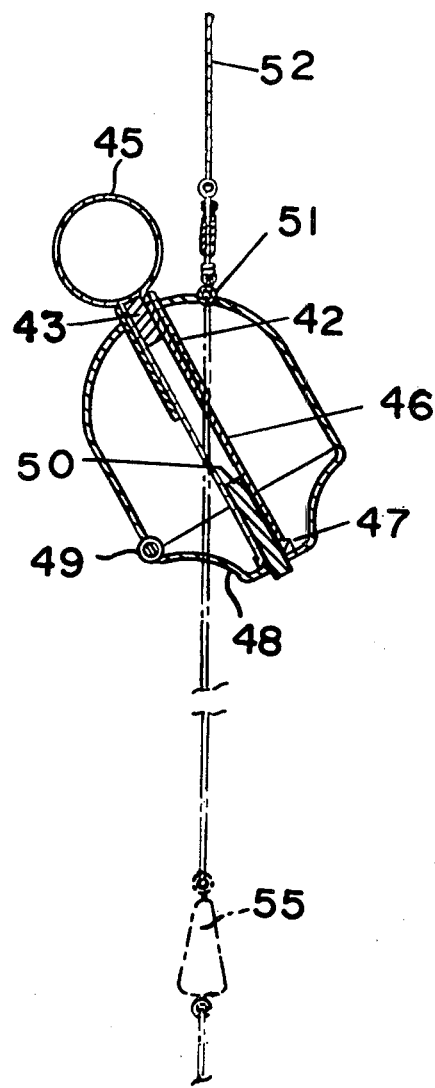

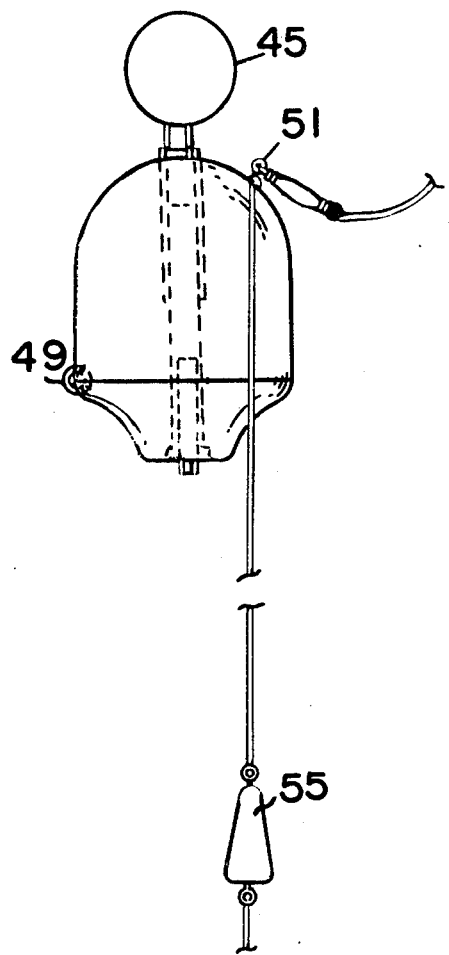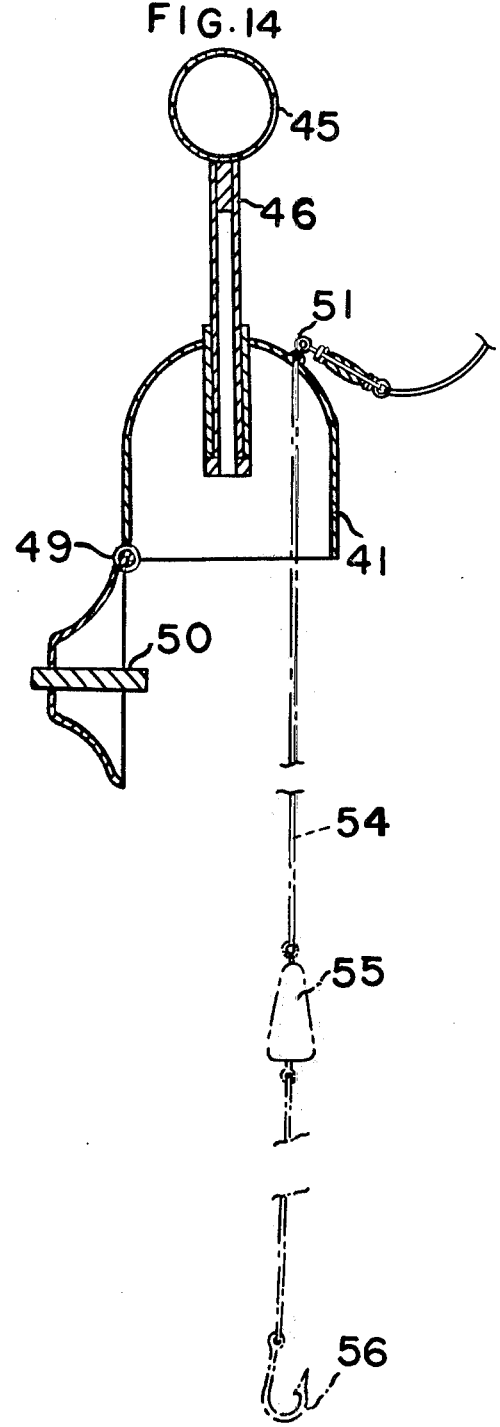

FISH-FEEDER

BACKGROUND OF THE INVENTION

This invention relates to a device for feeding bait to fish.

Presently with the increase of leisure time, fishing has been spotlighted as a way to spend such leisure time. For catching a number of fish, there have been several types of fish-feeders which are available. However, conventional fish-feeders have lids from which the bait is discharged into the water at the side of the device. Therefore when they are cast into the water surface, and the lid is opened for discharging bait from the container, most of the bait passes in a direction of the water tide resulting in a small amount of bait which settles downwardly to a required position in the water.

Accordingly, it is an object of the present invention to provide a fish-feeder which mainly comprises a container, a bottom lid on the container, and an opening means which automatically discharges the bait to a required position in the water after the fish-feeder has been cast into the water.

Another object of the present invention is to provide a fish-feeder which is simple in construction and which is entirely free from mechanical troubles.

BRIEF DESCRIPTION OF THE DRAWINGS

FIG. 1 is a front view of a fish-feeder according to a first embodiment of the present invention.

FIG. 2 is a transverse cross-sectional view of the fish-feeder taken along the line I—I of FIG. 1.

FIG. 3 is a longitudinal cross-sectional view taken along the line II—II of FIG. 1.

FIG. 4 is a transverse cross-sectional view of the fish-feeder taken along the line III—III of FIG. 1.

FIG. 5A is a partial front view partly broken away of a second embodiment showing the engagement of the swinging portion of the container and the perpendicular plate jutting from the rim portion of the bottom lid.

FIG. 8 is a longitudinal cross-sectional view of the fish-feeder taken along the line IV—IV of FIG. 7.

FIG. 9 is a transverse cross-sectional view of the fish-feeder taken along the line V—V of FIG. 8.

FIG. 10 is a front view of a fish-feeder in a slanted position according to a fourth embodiment of the present invention.

FIG. 11 is a plan view of the the fish-feeder shown in FIG. 10.

FIG. 12 is a longitudinal cross-sectional view of the feeder taken along the line VI—VI of FIG. 10.

FIG. 13 is a front view of the above fish-feeder in an upright portion after having settled into the water.

FIG. 14 is a cross-sectional view of the above feeder showing its condition after the bait has been discharged downwardly with the bottom lid being opened.

DETAILED DESCRIPTION OF THE INVENTION

FIRST EMBODIMENT

Figure 5B:
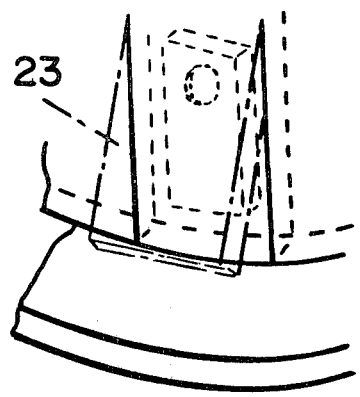
FIG. 5B is a partially enlarged perspective view of the feeder in FIG. 5 and showing the swinging plate.

Referring to FIG. 1 and FIG. 3, numeral 1 indicates a bell-shaped container with a number of apertures 2 formed along the entire circular periphery thereof. An elongated sleeve 3 disposed in the container 1 is concentric with the container 1 and has one end secured to the inner top portion of the container 1. Numeral 4 indicates a suspending means which is shaped like a pincette having a distal end formed like Ω and is slidably disposed in the sleeve 3. The other end of the suspending means 4 protrudes from the top of the bell-shaped container 1 and is shaped like a ring for preventing the further lowering of the suspending means 4 into the container.

Figure 6:
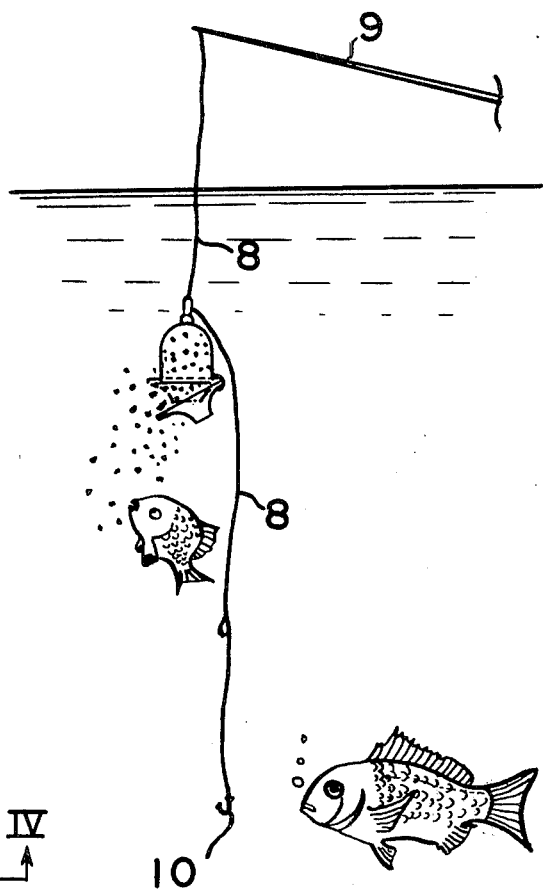
FIG. 6 is a schematic view showing the feeder according to the first and second embodiment in practical use.

Numeral 5 indicates a bottom lid which comprises an upwardly and outwardly extending circular peripheral portion and a bottom plate. This bottom lid is hinged to the container 1 by a hinge means 6 permitting the swinging movement of the bottom lid 5. This bottom lid 5 also comprises a sleeve 7 which extends into the middle portion of the lid 5 and which is parallel to the bottom plate of the bottom lid 5. As shown in FIG. 6, numeral 8 indicates a line and numeral 9 shows a rod. Numeral 10 indicates a hook.

As best can be seen in FIG. 3, opening of the bottom lid 5 is prevented by the suspending means 4 which softly but without fail holds the sleeve 7.

The manner in which the device operates is as follows:

i. The bottom lid 5 is opened and the proper amount of bait is placed into the container 1.

ii. The bottom lid 5 is reclosed with the sleeve 7 being held by the suspending means 4.

iii. The fish-feeder is suspended by the line 8 and is cast into the water.

iv. When the fish-feeder is settled to a desired position in the water, the line 8 is jerked by a rod 9 so as to cause the surrounding water to flow against the upper portion of the peripheral brim of the bottom lid 5, whereby the sleeve 7 is released from the suspending means 4 resulting in the opening of the lid 5 and the bait is discharged downwardly into the water from the container 1.

Since the settling bait conceals the fishline 8 and the hook 10, a fish bites the hook 10 without being aware of the hook.

SECOND EMBODIMENT

As shown in FIG. 5A and FIG. 5B, the construction of the fish-feeder of this embodiment is similar to that of the first embodiment with the exception of the opening means.

In this second embodiment, as best can be seen in FIG. 5A, a perpendicular plate 21 having a protruding portion 22 which juts from the rim of the bottom lid 15 is latchedly engaged with a bottom part 23 of the circumferential wall which has both sides longitudinally slitted so as to swing inwardly or outwardly. The manner in which the device is operated is as follows:

i. The bottom lid 15 is opened and the proper amount of bait is placed into the container.

ii. The bottom lid 15 is reclosed having the perpendicular plate 21 engaged with the bottom part 23.

iii. The fish-feeder is suspended by a line 18 and is cast into the water.

iv. When the fish-feeder is settled to a desired position in the water, the line 18 is jerked by a rod so as to cause the surrounding water to flow against the upper portion of the peripheral brim of the bottom lid 15, whereby the bottom part 23 is swung outwardly giving rise to the opening of the lid 15 and the bait is discharged downwardly into the water from the container 11.

THIRD EMBODIMENT

Figure 7:
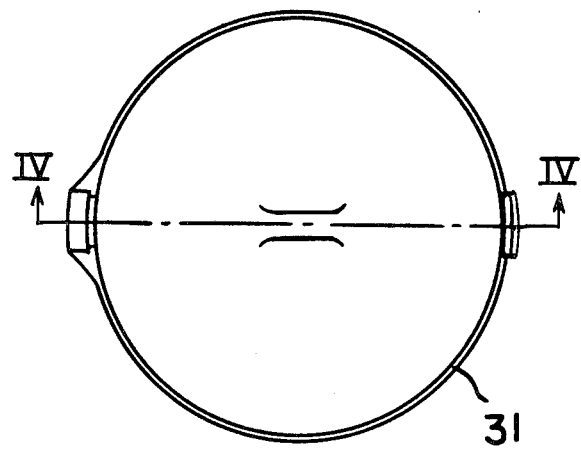
FIG. 7 is a plan view of a fish-feeder according to a third embodiment of the present invention.

Referring to FIGS. 7, 8 and 9, numeral 31 indicates a bell-shaped container which is made of flexible material. The wall of the container 31 is of decreasing thickness with the hinge side being the thickest and the latch side being the thinnest.

On the thinnest or lip side, a latch is formed by a preformed lip 33 on the edge of the body which is mated to a concave recess 34 preformed as part of a lid 35. On the thickest or hinge side, the lid 35 is pivotally secured to the bottom end of the container 31 by a hinge means 36. Numeral 37 indicates a lug which is formed on the top of the container 31 and which has an opening therein. The operation of the third embodiment is as follows:

i. The bottom lid 35 is opened and the proper amount of bait is charged into the container 31.

ii. The bottom lid 35 is reclosed having the lip 33 disposed in the concave recess 34.

iii. The feeder is cast into the water and allowed to sink to a predetermined position.

iv. The surrounding water causes pressure upon the thinnest side of the container 31 and causes an inward deflection of the thinnest side whereby the lip 33 is released from the recess 34 giving rise to the opening of the lid 35. The bait is thereby discharged downwardly into the water from the container 31. In other words because the lid is made of very heavy material, it is not effected by the pressure but the lip 33 separates from the recess 34 causing the lid 33 to open on the hinge 36. As the lid opens, the bait falls in the direction of the hook as in previous embodiments.

FOURTH EMBODIMENT

Referring to FIG. 10 to FIG. 15, numeral 41 indicates a bell-shaped container in a slanted condition. A concentric sleeve 42 is disposed in the container 41 and is integral with the container 41. Numeral 44 is a float which comprises a float portion 45, a sleeve portion 46 and a radially-expanded portion 47. A bottom lid 48 has a portion of its upper end pivotally secured to a portion of the bottom end of the container 41 by a hinge means 49. Numeral 43 is a plug reinforcing sleeve 46.

Numeral 50 indicates a shaft means which protrudes perpendicularly from the base of the bottom lid 48 and is slidably disposed in the sleeve portion 46.

A ring 51 is fixedly secured to the eccentric shoulder portion of the container 41. Numeral 52 indicates a first line which has one end tied to the ring 51.

Numeral 53 is a fishing pole. Numeral 54 is a second line extending downwardly from the ring, holding sinker 55 and a hook 56 there below.

Figure 15:
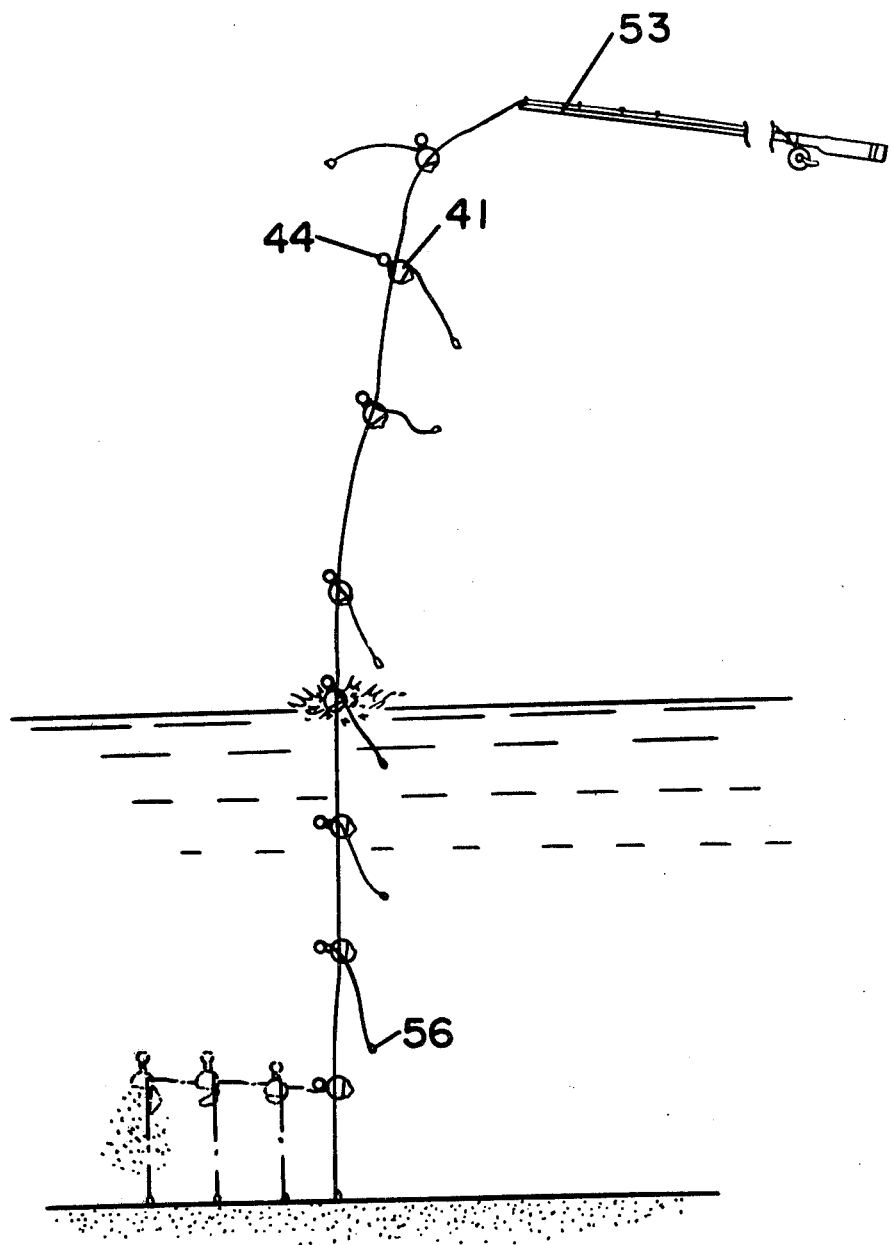
FIG. 15 is a schematic view showing how a plurality of feeders according to the present invention are operated in the water.

The manner in which the apparatus is operated is as follows:

i. The bottom lid 48 is opened and the proper amount of bait is charged into the container 41.

ii. The bottom lid 48 is reclosed having the shaft 50 loosely disposed in the sleeve portion 46.

iii. The fish-feeder is suspended by the line 52 and is cast into the water by the rod 53. When suspended by the line 52, the feeder will be located in a slanted position. Therefore, when it is cast into the water, it sinks into the water without the shaft 50 disengaging from the sleeve portion 46.

iv. During the settling of the feeder, the latter maintains the slanted position and the bottom lid 48 is kept closed because the weight of the sinker 55 is greater than the buoyancy of the float portion 45.

v. When the sinker 55 contacts the bottom or the bed, the feeder stops descending and simultaneously changes its position to an upright position because of the buoyancy of the float 44. Further, the same buoyancy of the float 44 pulls up the sleeve 46 disengaging the shaft 50 from the sleeve 46 and the bottom lid 48 is opened as shown in FIG. 15 to discharge the bait downwardly.

What we claim is:

1. A fish-feeder comprising a bell-shaped container having a peripheral bottom, said bell-shaped container having a plurality of apertures formed along the entire outer surface thereof, a bottom lid for discharging bait from said container, said bottom lid having a peripheral brim which is in contact with the entire peripheral bottom of said container when said lid is closed, connecting means tightly and releasably connecting said container and said bottom lid whereby bait is adapted to be contained in said container when the lid is in a closed position and to be released from the container when the lid is opened, said connecting means comprising a hinge means and a latching means, said hinge means pivotally securing said bottom lid to said container, said lid having a sleeve extending transversely thereof, said latching means comprising a suspending means on said container which is shaped like a pincette having a distal end formed as a generally inverted U-shaped configuration for holding said sleeve and said bottom lid in a closed position, said pincette being adapted to release said sleeve to thereby open said lid to discharge said bait from the container.

* * * * *